Nov. 16, 1926.                                          1,607,249
G. H. DYER
COMBINATION GARBAGE CAN LID AND FLYTRAP
Filed Feb. 25, 1926

WITNESS
Robt. S. Woolsey

INVENTOR
GEORGE HOUCK DYER
by James R. Townsend
his atty

Patented Nov. 16, 1926.

1,607,249

UNITED STATES PATENT OFFICE.

GEORGE HOUCK DYER, OF LONG BEACH, CALIFORNIA.

COMBINATION GARBAGE-CAN LID AND FLYTRAP.

Application filed February 25, 1926. Serial No. 90,527.

An object of this invention is to eliminate the fly pest from localities where moist refuse is allowed to stand in cans or other receptacles accessible to the flies.

I have observed that flies are attracted by fumes or effluvia rising from moist accumulations and that they are particularly attracted to garbage cans and like receptacles in which accumulations of moist refuse are allowed to stand, and an object of this invention is to provide means operating in combination with such cans to entrap flies attracted to the cans by the effluvia therefrom, and the invention is broadly new, basic and pioneer in that I provide a lid or cover for the refuse receptacle in which lid or cover a chamber is provided below the top of the lid having a floor permeable to the effluvia, and having, between the floor and the top of the lid, screened openings through which the effluvia may pass; said openings being provided with a trapping fly-way through which the flies may readily enter into the chamber and out of which they are unable to pass.

An object is to make provision whereby the escape of effluvia from the can will be practically eliminated and yet will be sufficient to attract the flies and cause them to enter the lid through the fly-ways.

Another object is to provide for convenient removal of the accumulated flies.

Other objects are cheapness and simplicity of construction, and ease of keeping clean and in sanitary condition.

Other objects, advantages and features of invention may appear from the accompanying drawing, the subjoined detailed description and the appended claims.

The accompanying drawing illustrates the invention.

Figure 6:
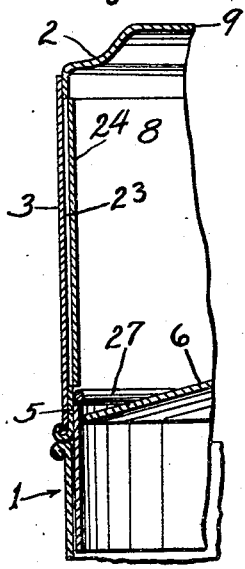
Fig. 6 is a sectional elevation on line $x^6$, Fig. 3.
Figure 1:
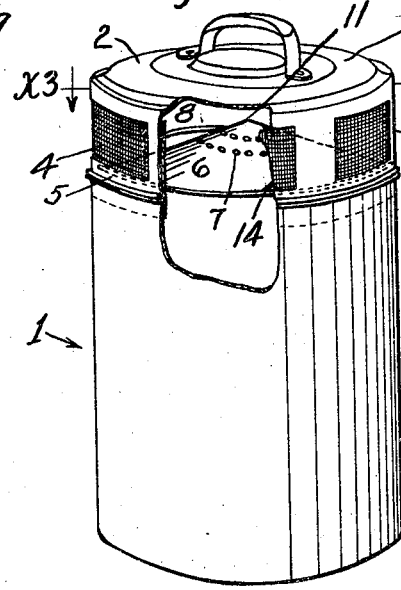
Figure 1 is a perspective view of the device constructed in accordance with this invention, portions being broken away to expose parts otherwise not clearly shown.
Figure 7:
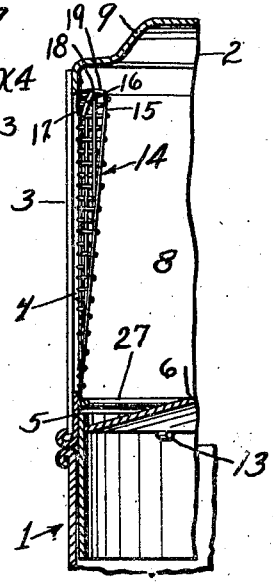
Fig. 7 is a sectional elevation on line $x^7$, Fig. 3.
Figure 2:
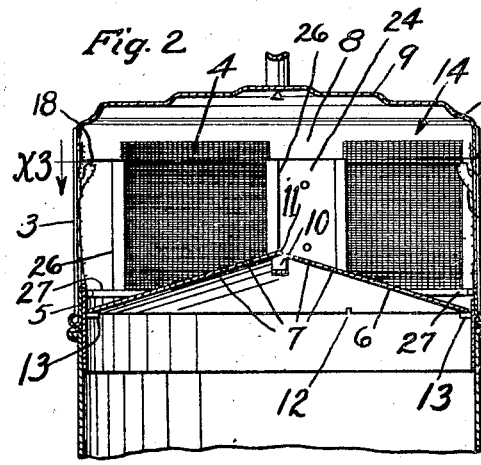
Fig. 2 is a broken axial section.
Figure 3:
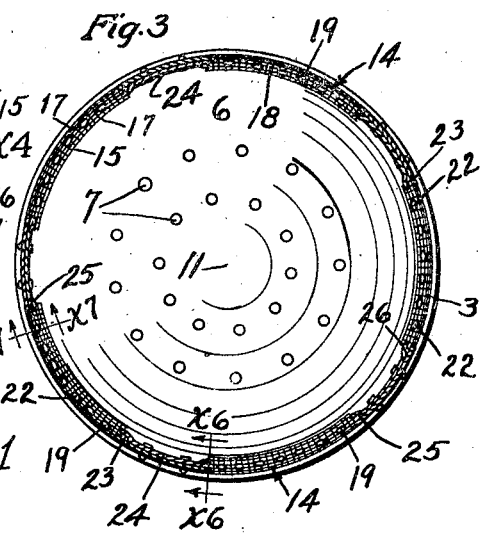
Fig. 3 is a plan in section on line $x^3$—$x^4$, Figs. 1 and 2, just above the fly inlet.
Figure 5:
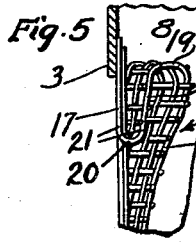
Fig. 5 is an enlarged fragmental view of the folds in the wire screen and of the fly trap entrance.
Figure 4:
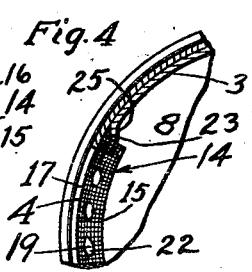
Fig. 4 is an enlarged fragmental section on said line $x^3$—$x^4$.

The garbage can or receptacle 1 may be of any usual and convenient size, dimensions and form and is shown in the circular form common to garbage cans. The lid 2 has a rim 3 of a depth preferably greater than that common in the usual construction of the garbage can lid rims so as to make provision for one or more openings 4 above the portion 5 of the rim that fits upon the body of the garbage can or other refuse receptacle.

6 indicates the floor or cross bottom fitted to and retained in the depending rim 3. Said bottom is shown of conical form and is provided with small perforations 7 near its peak to allow effluvia to rise to the chamber 8 provided between the floor 6 and the top 9 of the can. A loop forming a handle 10 is fixed to the underside of the floor 6 and extends across the cavity formed by the peak 11, said floor is also shown provided with a notch 12 to clamp a pin 13 projecting inwardly from the lower part of the depending rim and adapted to support the floor when the same has been inserted into the rim and turned to bring the notch out of register with the pin.

Preferably two notches and pins therefore are arranged diametrically across the lid and floor so that the floor will be perfectly supported when inserted and turned as stated.

The fly trapping screen 14 may be of any suitable construction and is shown as being formed of common wire screen of too fine mesh to allow the insects to pass therethrough and being made of three folds as at 15, 16 and 17; the inner ply 15 being connected with the intermediate ply 16 by the bridging 18 through which entrance orifices 19 are arranged.

The outer ply 17 is formed by a fold 20 or bend 20 so as to give a finished edge to the guard 21 formed by the intermediate and outer plies.

I have discovered that by providing elongated orifices 22, extending along the bridging, the insects find easier access to the chamber of the trap.

The flies readily find access to the trap chamber but cannot return.

The wire screen folds are preferably made dependently and of moderate size and are removably secured inside the rim. The means for securing the same as shown, consists of grooves 23 on opposite sides of the receptacle and these grooves are shown as made by sheet metal strips 24 stamped to provide inward off-set flanges 25 adjacent to the edges 26 of the vertical bar 24 formed with the screens intermediate the opening across which the screens extend. The screens extend above the bridging sufficiently to contact, and the lower edges of the screen members overlap the continuous rim below the openings and an expansion ring 27 is fitted on the overlapping edges of the screened sections and by expansion press the overlapping portions of such sections against the continuous rim below the openings.

It is understood that this invention is applicable to trapping cockroaches and where intended to be used for that purpose, the inlet orifice will be made of sufficient size to allow the cockroaches to freely enter. Then by leaving the garbage can with refuse in it, at the haunts of the cockroaches, such insects will be entrapped.

The garbage can lid is free from contact with the refuse in the can. Under ordinary circumstances when it is desired to thoroughly clean the lid, the flooring and the screen sections may be removed and all the parts of the lid may be thoroughly washed and antisepticized if desired.

I claim.

1. A lid provided with a depending rim having openings therein, and adapted to fit on a garbage can; screen sections for said openings, said sections being provided with inlets to allow insects to pass into the chamber and to prevent their exit therefrom; an expansion ring to hold said screen sections in place and a removable floor secured to said rim.

2. A lid comprising a top and a rim provided with openings having uprights between the openings; strips provided with flanges forming grooves to receive screen sections; screen sections folded and perforated to form insect entrances to the chamber and inserted in the grooves formed by said flanged strips; and a floor secured to the rim and permeable to allow effluvia to arise therethrough to attract insects into the space between the top and the floor.

3. In combination with a lid having a depending rim that is adapted to fit the top of the garbage can and is provided with openings through said rim; a wire screen section folded and provided with openings to admit insects but to prevent their return; the margin of the screen section that is nearest the inlet openings extended beyond said openings to engage the top of the lid, the other margin of the screen section overlapping the rim of the flange beyond the opening into the flange, and removable means to clamp the overlapping portion of the screen sections to such rim.

4. In combination with a lid having a top and also having a depending rim that is adapted to fit the top of a garbage can, and that is provided with screened openings affording inlet passages to insects, a conical floor to form with said rim a chamber below the top and that is provided with perforations to admit effluvia to the chamber, and means to hold said floor in the rim.

In testimony whereof, I have hereunto set my hand at Los Angeles, California, this 11th day of February, 1926.

GEORGE HOUCK DYER.